United States Patent
Narita et al.

(10) Patent No.: US 10,438,618 B2
(45) Date of Patent: Oct. 8, 2019

(54) MAGNETIC HEAD HAVING A STACKED BODY PROVIDED BETWEEN A MAGNETIC POLE AND A FIRST SHIELD AND A MAGNETIC RECORDING AND REPRODUCING DEVICE INCORPORATING THE MAGNETIC HEAD

(71) Applicant: KABUSHIKI KAISHA TOSHIBA, Tokyo (JP)

(72) Inventors: Naoyuki Narita, Fujisawa Kanagawa (JP); Tomoyuki Maeda, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/912,927

(22) Filed: Mar. 6, 2018

(65) Prior Publication Data
US 2019/0088274 A1 Mar. 21, 2019

(30) Foreign Application Priority Data
Sep. 19, 2017 (JP) .................................. 2017-179451

(51) Int. Cl.
G11B 5/31 (2006.01)
G11B 5/23 (2006.01)

(52) U.S. Cl.
CPC .............. G11B 5/315 (2013.01); G11B 5/23 (2013.01); G11B 5/314 (2013.01); G11B 5/3116 (2013.01)

(58) Field of Classification Search
CPC ............ G11B 5/23; G11B 5/314; G11B 5/315
USPC ......................................... 360/119.03, 125.3
See application file for complete search history.

(56) References Cited

U.S. PATENT DOCUMENTS

| | | | |
|---|---|---|---|
| 8,614,861 B1 | 12/2013 | Tomoda et al. | |
| 8,964,332 B1 * | 2/2015 | Katada | G11B 5/56 360/125.3 |
| 9,099,107 B1 * | 8/2015 | Igarashi | G11B 5/31 |
| 10,121,497 B1 * | 11/2018 | Takahashi | G11B 5/1278 |
| 2009/0059423 A1 * | 3/2009 | Yamada | G11B 5/02 360/122 |

(Continued)

FOREIGN PATENT DOCUMENTS

| | | |
|---|---|---|
| JP | 2014-10871 A | 1/2014 |
| JP | 2014-81981 A | 5/2014 |

(Continued)

*Primary Examiner* — Jefferson A Evans
(74) *Attorney, Agent, or Firm* — Finnegan, Henderson, Farabow, Garrett & Dunner, L.L.P.

(57) ABSTRACT

According to one embodiment, a magnetic head includes a magnetic pole, a first shield, and a stacked body provided between the magnetic pole and the first shield. The stacked body includes a first layer, the first layer being nonmagnetic, a second layer provided between the first layer and the first shield, the second layer being nonmagnetic, and a third layer contacting the first layer and the second layer, being provided between the first layer and the second layer, and being electrically connected to the first layer and the second layer. The third layer includes a first magnetic region, and a second magnetic region contacting the first magnetic region and being provided between the first magnetic region and the second layer. A second saturation magnetization of the second magnetic region is higher than a first saturation magnetization of the first magnetic region.

9 Claims, 8 Drawing Sheets

(56) References Cited

U.S. PATENT DOCUMENTS

| | | | |
|---|---|---|---|
| 2010/0007996 A1* | 1/2010 | Iwasaki | B82Y 10/00 360/324 |
| 2011/0134561 A1* | 6/2011 | Smith | G11B 5/1278 360/59 |
| 2011/0228423 A1* | 9/2011 | Koui | G11B 5/1278 360/75 |
| 2011/0300409 A1* | 12/2011 | Yamada | G01S 19/30 428/815.2 |
| 2012/0320474 A1* | 12/2012 | Soeno | G11B 5/314 360/319 |
| 2013/0229895 A1* | 9/2013 | Shiroishi | G11B 5/1278 369/13.14 |
| 2014/0085753 A1* | 3/2014 | Nagasaka | G11B 5/314 360/234.3 |
| 2014/0104724 A1* | 4/2014 | Shiroishi | G11B 5/66 360/75 |
| 2014/0268404 A1* | 9/2014 | Horide | G11B 5/235 360/75 |
| 2015/0124347 A1* | 5/2015 | Shimoto | G11B 5/1278 360/71 |
| 2017/0186450 A1* | 6/2017 | Yamada | G11B 5/1278 |
| 2017/0236537 A1* | 8/2017 | Murakami | G11B 5/315 360/125.3 |
| 2018/0075868 A1 | 3/2018 | Koui et al. | |
| 2018/0261241 A1 | 9/2018 | Narita et al. | |
| 2019/0051322 A1 | 2/2019 | Koizumi et al. | |
| 2019/0066717 A1 | 2/2019 | Ohtake et al. | |
| 2019/0088275 A1 | 3/2019 | Narita et al. | |

FOREIGN PATENT DOCUMENTS

| | | |
|---|---|---|
| JP | 2017-117502 A | 6/2017 |
| JP | 2018-45739 A | 3/2018 |
| JP | 2018-147540 A | 9/2018 |
| JP | 2018-156709 A | 10/2018 |
| JP | 2019-36372 A | 3/2019 |
| JP | 2019-46513 A | 3/2019 |

* cited by examiner

MAGNETIC HEAD HAVING A STACKED BODY PROVIDED BETWEEN A MAGNETIC POLE AND A FIRST SHIELD AND A MAGNETIC RECORDING AND REPRODUCING DEVICE INCORPORATING THE MAGNETIC HEAD

CROSS-REFERENCE TO RELATED APPLICATIONS

This application is based upon and claims the benefit of priority from Japanese Patent Application No. 2017-179451, filed on Sep. 19, 2017; the entire contents of which are incorporated herein by reference.

FIELD

Embodiments described herein relate generally to a magnetic head and a magnetic recording and reproducing device.

BACKGROUND

Information is recorded in a magnetic storage medium such as a HDD (Hard Disk Drive), etc., by using a magnetic head. It is desirable to increase the recording density of the magnetic head and a magnetic recording and reproducing device.

DETAILED DESCRIPTION

Figure 1A:
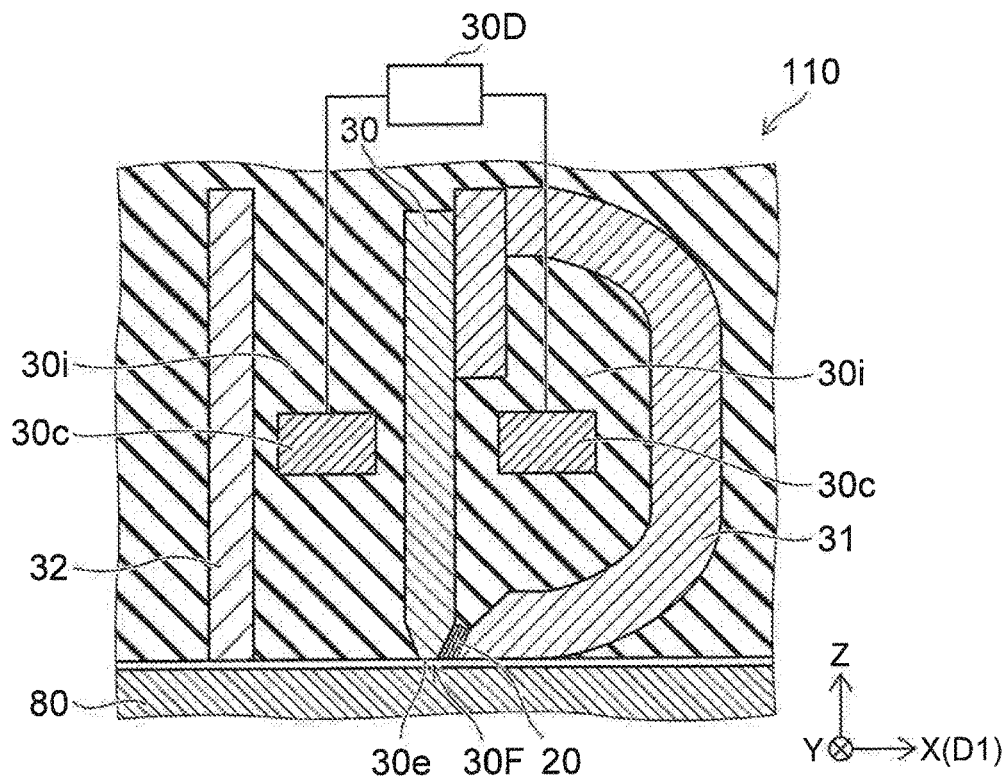
FIG. 1A and FIG. 1B are schematic cross-sectional views illustrating a magnetic head according to a first embodiment.

According to one embodiment, a magnetic head includes a magnetic pole, a first shield, and a stacked body provided between the magnetic pole and the first shield. The stacked body includes a first layer, the first layer being nonmagnetic, a second layer provided between the first layer and the first shield, the second layer being nonmagnetic, and a third layer contacting the first layer and the second layer, being provided between the first layer and the second layer, and being electrically connected to the first layer and the second layer. The third layer includes a first magnetic region, and a second magnetic region contacting the first magnetic region and being provided between the first magnetic region and the second layer. A second saturation magnetization of the second magnetic region is higher than a first saturation magnetization of the first magnetic region.

According to another embodiment, a magnetic head includes a magnetic pole, a first shield, and a stacked body provided between the magnetic pole and the first shield. The stacked body includes a first layer, the first layer being nonmagnetic, a second layer provided between the first layer and the first shield, the second layer being nonmagnetic, and a third layer contacting the first layer and the second layer, being provided between the first layer and the second layer, and being electrically connected to the first layer and the second layer. The third layer includes a first magnetic region, and a second magnetic region contacting the first magnetic region and being provided between the first magnetic region and the second layer. The second magnetic region includes at least one first element of Fe or Co at a first composition ratio. The first magnetic region does not include the first element, or includes the first element at a second composition ratio lower than the first composition ratio.

According to another embodiment, a magnetic head includes a magnetic pole, a first shield, and a stacked body provided between the magnetic pole and the first shield. The stacked body includes a first layer, the first layer being nonmagnetic, a second layer provided between the first layer and the first shield, the second layer being nonmagnetic, and a third layer contacting the first layer and the second layer, being provided between the first layer and the second layer, and being electrically connected to the first layer and the second layer. The third layer includes a first magnetic region, a second magnetic region provided between the first magnetic region and the first shield, and an intermediate region including at least one selected from the group consisting of Ru, Ir, and Rh, being provided between the first magnetic region and the second magnetic region, and contacting the first magnetic region and the second magnetic region. A second saturation magnetization of the second magnetic region is higher than a first saturation magnetization of the first magnetic region.

According to another embodiment, a magnetic head includes a magnetic pole, a first shield, and a stacked body provided between the magnetic pole and the first shield. The stacked body includes a first layer, the first layer being nonmagnetic, a second layer provided between the first layer and the first shield, the second layer being nonmagnetic, and a third layer contacting the first layer and the second layer, being provided between the first layer and the second layer, and being electrically connected to the first layer and the second layer. The third layer includes a first magnetic region, a second magnetic region provided between the first magnetic region and the first shield, and an intermediate region including at least one selected from the group consisting of Ru, Ir, and Rh, being provided between the first magnetic region and the second magnetic region, and contacting the first magnetic region and the second magnetic region. The second magnetic region includes at least one first element of Fe or Co at a first composition ratio. The first magnetic region does not include the first element, or includes the first element at a second composition ratio lower than the first composition ratio.

According to another embodiment, a magnetic recording and reproducing device includes one of the magnetic heads described above, and a first electrical circuit electrically connected to the first layer and the second layer and configured to supply, to the stacked body, a current having an orientation from the first layer toward the second layer.

According to another embodiment, a magnetic head includes a magnetic pole, a first shield, and a stacked body provided between the magnetic pole and the first shield. The stacked body includes a first layer, the first layer being nonmagnetic, a second layer provided between the first layer and the first shield, the second layer being nonmagnetic, and a third layer contacting the first layer and the second layer, being provided between the first layer and the second layer, and being electrically connected to the first layer and the second layer. The third layer includes a first magnetic region, and a second magnetic region contacting the first magnetic region and being provided between the first magnetic region and the second layer. A second saturation magnetization of the second magnetic region is smaller than a first saturation magnetization of the first magnetic region.

According to another embodiment, a magnetic head includes a magnetic pole, a first shield, and a stacked body provided between the magnetic pole and the first shield. The stacked body includes a first layer, the first layer being nonmagnetic, a second layer provided between the first layer and the first shield, the second layer being nonmagnetic, and a third layer contacting the first layer and the second layer, being provided between the first layer and the second layer, and being electrically connected to the first layer and the second layer. The third layer includes a first magnetic region, and a second magnetic region contacting the first magnetic region and being provided between the first magnetic region and the second layer. The first magnetic region includes at least one first element of Fe or Co at a first composition ratio. The second magnetic region does not include the first element, or includes the first element at a second composition ratio lower than the first composition ratio.

According to another embodiment, a magnetic head includes a magnetic pole, a first shield, and a stacked body provided between the magnetic pole and the first shield. The stacked body includes a first layer, the first layer being nonmagnetic, a second layer provided between the first layer and the first shield, the second layer being nonmagnetic, and a third layer contacting the first layer and the second layer, being provided between the first layer and the second layer, and being electrically connected to the first layer and the second layer. The third layer includes a first magnetic region, a second magnetic region provided between the first magnetic region and the first shield, and an intermediate region including at least one selected from the group consisting of Ru, Ir, and Rh, being provided between the first magnetic region and the second magnetic region, and contacting the first magnetic region and the second magnetic region. A second saturation magnetization of the second magnetic region is smaller than a first saturation magnetization of the first magnetic region.

According to another embodiment, a magnetic head includes a magnetic pole, a first shield, and a stacked body provided between the magnetic pole and the first shield. The stacked body includes a first layer, the first layer being nonmagnetic, a second layer provided between the first layer and the first shield, the second layer being nonmagnetic, and a third layer contacting the first layer and the second layer, being provided between the first layer and the second layer, and being electrically connected to the first layer and the second layer. The third layer includes a first magnetic region, a second magnetic region provided between the first magnetic region and the first shield, and an intermediate region including at least one selected from the group consisting of Ru, Ir, and Rh, being provided between the first magnetic region and the second magnetic region, and contacting the first magnetic region and the second magnetic region. The first magnetic region includes at least one first element of Fe or Co at a first composition ratio. The second magnetic region does not include the first element, or includes the first element at a second composition ratio lower than the first composition ratio.

First Embodiment

Figure 1B:
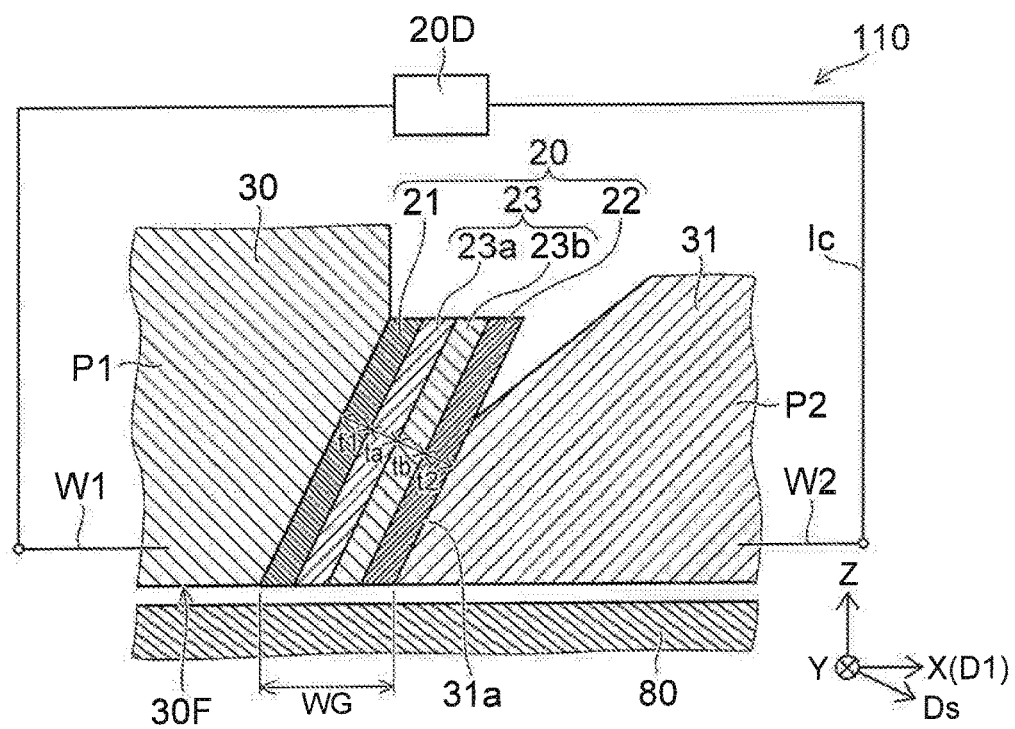

FIG. 1A and FIG. 1B are schematic cross-sectional views illustrating a magnetic head according to a first embodiment.

FIG. 1B is an enlarged view of a portion of FIG. 1A.

As shown in FIG. 1A, the magnetic head 110 according to the embodiment includes a magnetic pole 30, a first shield 31, and a stacked body 20. A second shield 32 and a coil 30c are further provided in the example.

The magnetic pole 30 is positioned between the first shield 31 and the second shield 32. At least a portion of the coil 30c is positioned between the magnetic pole 30 and the first shield 31. In the example, a portion of the coil 30c is positioned between the magnetic pole 30 and the second shield 32.

A recording electrical circuit (a second electrical circuit 30D) is electrically connected to the coil 30c. A recording current is supplied from the recording electrical circuit to the coil 30c; and a magnetic field (a recording magnetic field) that corresponds to the recording current is generated from the magnetic pole 30. The recording magnetic field is applied to a magnetic recording medium 80; and information is recorded in the magnetic recording medium 80. Thus, the recording electrical circuit (the second electrical circuit 30D) is configured to supply, to the coil 30c, a current (a recording current) corresponding to the information to be recorded.

The stacked body 20 is provided between the magnetic pole 30 and the first shield 31.

An insulating portion 30i is provided around the magnetic pole 30, the first shield 31, the second shield 32, the coil 30c, and the stacked body 20.

A first surface 30F is provided at an end 30e of the magnetic pole 30. The first surface 30F is, for example, a medium-opposing surface. The first surface 30F is aligned with the ABS of the magnetic head 110. The first surface 30F opposes the magnetic recording medium 80.

A direction perpendicular to the first surface 30F is taken as a Z-axis direction. One direction perpendicular to the Z-axis direction is taken as an X-axis direction. A direction perpendicular to the Z-axis direction and the X-axis direction is taken as a Y-axis direction.

The Z-axis direction is, for example, the height direction. The X-axis direction is, for example, the down-track direction. The Y-axis direction is the cross-track direction.

The first shield 31 is separated from the magnetic pole 30 along a first direction D1 aligned with the first surface 30F. In the example, the first direction D1 is aligned with the X-axis direction.

For example, the first shield 31 is separated from the magnetic pole 30 along the X-axis direction at the vicinity of the first surface 30F. For example, the magnetic pole 30 is separated from the second shield 32 along the X-axis direction at the vicinity of the first surface 30F. For example, a portion of the first shield 31 is separated from a portion of the magnetic pole 30 along the X-axis direction. For example, a portion of the magnetic pole 30 is separated from a portion of the second shield 32 along the X-axis direction. The magnetic head 110 and the magnetic recording medium 80 move relatively substantially along the X-axis direction. Thereby, information is recorded at any position of the magnetic recording medium 80.

The magnetic pole 30 is, for example, a main pole. The first shield 31 is, for example, a trailing shield. The first shield 31 can form a magnetic core with the magnetic pole 30. The magnetic head 110 may further include, for example, another shield such as a side shield, etc.

As shown in FIG. 1B, the stacked body 20 includes a first layer 21, a second layer 22, and a third layer 23.

The first layer 21 includes a nonmagnetic layer. The first layer 21 is conductive. The first layer 21 is provided between the magnetic pole 30 and the first shield 31.

The second layer 22 is provided between the first layer 21 and the first shield 31. The second layer 22 includes a nonmagnetic layer. The second layer 22 is conductive.

In the magnetic head 110, the first layer 21 includes, for example, at least one selected from the group consisting of Cu, Ag, Au, and Al. On the other hand, the second layer 22 includes at least one selected from the group consisting of Ta, Pt, W, Ru, Mo, and Pd.

The third layer 23 contacts the first layer 21 and the second layer 22 between the first layer 21 and the second layer 22. The third layer 23 is a magnetic layer. The third layer 23 is conductive. The third layer 23 is electrically connected to the first layer 21 and the second layer 22.

The third layer 23 includes a first magnetic region 23a and a second magnetic region 23b. The second magnetic region 23b is provided between the first magnetic region 23a and the second layer 22. The second magnetic region 23b contacts the first magnetic region 23a. For example, the first magnetic region 23a contacts the first layer 21. The second magnetic region 23b contacts the second layer 22.

In the embodiment, the saturation magnetization (a second saturation magnetization) of the second magnetic region 23b is larger than the saturation magnetization (a first saturation magnetization) of the first magnetic region 23a.

For example, the second magnetic region 23b includes at least one first element of Fe or Co. For example, the second magnetic region 23b includes the first element at a first composition ratio. On the other hand, the first magnetic region 23a does not include the first element; or the first magnetic region 23a includes the first element at a second composition ratio that is lower than the first composition ratio. For example, in the case where FeCo is included in the first magnetic region 23a and the second magnetic region 23b, the second saturation magnetization can be set to be higher than the first saturation magnetization by changing the composition ratio.

For example, the second magnetic region 23b includes FeCo, Fe, Co, etc. On the other hand, the first magnetic region 23a includes Ni, FeNi, etc. Thereby, the second saturation magnetization is higher than the first saturation magnetization. For example, the saturation magnetizations of the first magnetic region 23a and the second magnetic region 23b can be adjusted using at least one of the various materials, the composition ratios of the various alloys, the materials of the superlattice films, or the film thickness ratio.

Thus, in the embodiment, the third layer 23 recited above is provided in the stacked body 20 provided between the magnetic pole 30 and the first shield 31. The saturation magnetization changes in the third layer 23. For example, the second magnetic region 23b and the first magnetic region 23a that have different saturation magnetizations are provided. Thereby, as described below, the recording density can be increased.

The first shield 31 has a first shield surface 31a. The first shield surface 31a opposes the second layer 22. The first shield surface 31a contacts the second layer 22.

In the example, the first shield surface 31a is tilted with respect to the first surface 30F (e.g., the X-Y plane). The recording magnetic field that is generated at the vicinity of the first surface 30F of the magnetic pole 30 can be strengthened. Stable high density recording is possible.

For example, a first interconnect W1 and a second interconnect W2 are provided in the magnetic head 110. These interconnects are configured to supply a current Ic to the stacked body 20.

In the example, the first interconnect W1 is electrically connected to the magnetic pole 30. The second interconnect W2 is electrically connected to the first shield 31. The first interconnect W1 may be electrically connected to the first layer 21. The second interconnect W2 may be electrically connected to the second layer 22. The first interconnect W1 and the second interconnect W2 are electrically connected to a first electrical circuit 20D. The first electrical circuit 20D is configured to supply the current Ic to the stacked body 20.

For example, as described below, the current Ic has, for example, an orientation from the first layer 21 toward the second layer 22. In the case where the current Ic is supplied, an electron current flows from the second layer 22 toward the first layer 21.

A thickness t1 of the first layer 21 is, for example, not less than 0.5 nm (nanometers) and not more than 5 nm. A thickness t2 of the second layer 22 is, for example, not less than 0.5 nm and not more than 5 nm. A thickness to of the first magnetic region 23a is, for example, not less than 1 nm and not more than 10 nm. A thickness tb of the second magnetic region 23b is, for example, not less than 4 nm and not more than 15 nm. These thicknesses are lengths along a stacking direction Ds of the stacked body 20. For example, the stacking direction Ds is perpendicular to the first shield surface 31a.

The magnetic pole 30 includes a first portion P1 overlapping the stacked body 20 in the first direction D1 (the X-axis direction). On the other hand, the first shield 31 includes a second portion P2 overlapping the stacked body 20 in the first direction D1. The distance along the first direction D1 between the first portion P1 and the second portion P2 corresponds to a write gap WG. In the embodiment, the write gap WG is, for example, not less than 15 nm and not more than 30 nm.

As described above, interconnects (e.g., the first interconnect W1 and the second interconnect W2) that are configured to supply the current Ic to the stacked body 20 can be provided in the magnetic head 110. As described below, by causing the current Ic to flow in the stacked body 20, it is easy to effectively apply the magnetic field (the recording magnetic field) generated from the magnetic pole 30 to the magnetic recording medium 80.

Figure 2:
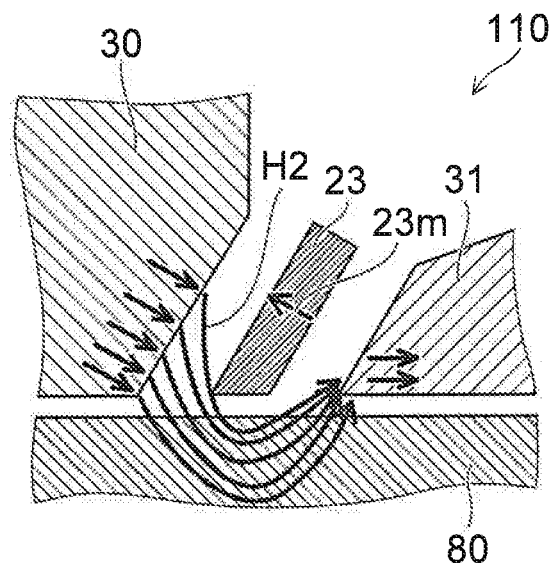
FIG. 2 is a schematic view illustrating the operation of the magnetic head according to the first embodiment.

FIG. 2 is a schematic view illustrating the operation of the magnetic head according to the first embodiment.

A magnetic field that has a component from the magnetic pole 30 toward the first shield 31 is generated by causing the recording current to flow in the coil 30c. In a first reference example in which the stacked body 20 is not provided, a portion of the magnetic field emitted from the magnetic pole 30 directly enters the first shield 31 without being oriented toward the magnetic recording medium 80. Therefore, the magnetic field is not easily applied to the magnetic recording medium 80. At this time, in the magnetic head 110 as shown in FIG. 2, by causing the current Ic to flow in the stacked body 20, the magnetization of the third layer 23 has a component in the reverse orientation of the orientation of a magnetic field H2 emitted from the magnetic pole 30. Therefore, the magnetic field H2 that is emitted from the magnetic pole 30 does not easily pass through the third layer 23. Much of the magnetic field H2 passes through the magnetic recording medium 80 and enters the first shield 31. Therefore, the magnetic field H2 easily is applied to the magnetic recording medium 80. The magnetic field H2 is applied to the magnetic recording medium 80 even in the case where the write gap is set to be small.

Thus, in the embodiment, even in the case where the write gap is set to be small, the magnetic field H2 that is emitted from the magnetic pole 30 and is oriented directly toward the first shield 31 is suppressed. As a result, much of the magnetic field H2 that is emitted from the magnetic pole 30 is oriented toward the magnetic recording medium 80; and an effective recording magnetic field is applied to the magnetic recording medium 80. Thereby, it is possible to increase the recording density.

On the other hand, there is a second reference example in which a spin torque oscillator (STO) is provided between the magnetic pole 30 and the first shield 31. The STO includes two magnetic layers, and a nonmagnetic layer provided between the two magnetic layers. The high frequency magnetic field that is generated from the STO is applied to the magnetic recording medium 80; and the magnetization of the magnetic recording medium 80 easily changes locally. Microwave-assisted magnetic recording is performed by using this effect.

Conversely, in the embodiment, the stacked body 20 that is provided between the magnetic pole 30 and the first shield 31 includes one third layer 23. In the embodiment, a high frequency magnetic field that is generated from the stacked body 20 is not utilized. In the embodiment, the magnetic field H2 that is emitted from the magnetic pole 30 is effectively oriented toward the magnetic recording medium 80 by utilizing a magnetization 23m of the third layer 23 of the stacked body 20.

In the embodiment, for example, the magnetization 23m of the third layer 23 has a component in the reverse orientation of the magnetic field H2 generated from the magnetic pole 30 due to the spin torque due to the current Ic flowing through the stacked body 20.

An example of characteristics of the magnetic head will now be described.

A simulation of the characteristics of the magnetic head is performed. The simulation is performed using a micromagnetic simulation based on the LLG (Landau-Lifshitz-Gilbert) equations.

The magnetic head 110 that has a first configuration has the configuration described with reference to FIG. 1A and FIG. 1B. The parameters of each layer are as follows. A first saturation magnetization Ms1 of the first magnetic region 23a is 0.5 T (teslas). The thickness to of the first magnetic region 23a is 2 nm. The magnetic volume (Ms1·ta) of the first magnetic region 23a is 1 nmT. A second saturation magnetization Ms2 of the second magnetic region 23b is 1.5 T. The thickness tb of the second magnetic region 23b is 8 nm. The magnetic volume (Ms2·tb) of the second magnetic region 23b is 12 nmT. A damping constant α is 0.02 in each magnetic region. The thickness t1 of the first layer 21 is 2 nm. The values of Cu are used as the physical property values of the first layer 21. For example, the spin relaxation length of Cu is long. The thickness t2 of the second layer 22 is 2 nm. The values of Ta are used as the physical property values of the second layer 22. For example, the spin relaxation length of Ta is short. It is taken that the spin torque does not act at the interface between the second layer 22 and the second magnetic region 23b.

On the other hand, the saturation magnetization is constant in the third layer 23 of a magnetic head 119 that has a second configuration. A saturation magnetization Ms of the third layer 23 is 1.3 T. The thickness of the third layer 23 is 10 nm. The magnetic volume (Ms·t) of the third layer 23 is 13 nmT. The average magnetic volume of the third layer 23 of the magnetic head 119 is the same as the average magnetic volume of the third layer 23 of the magnetic head 110.

Figure 3:
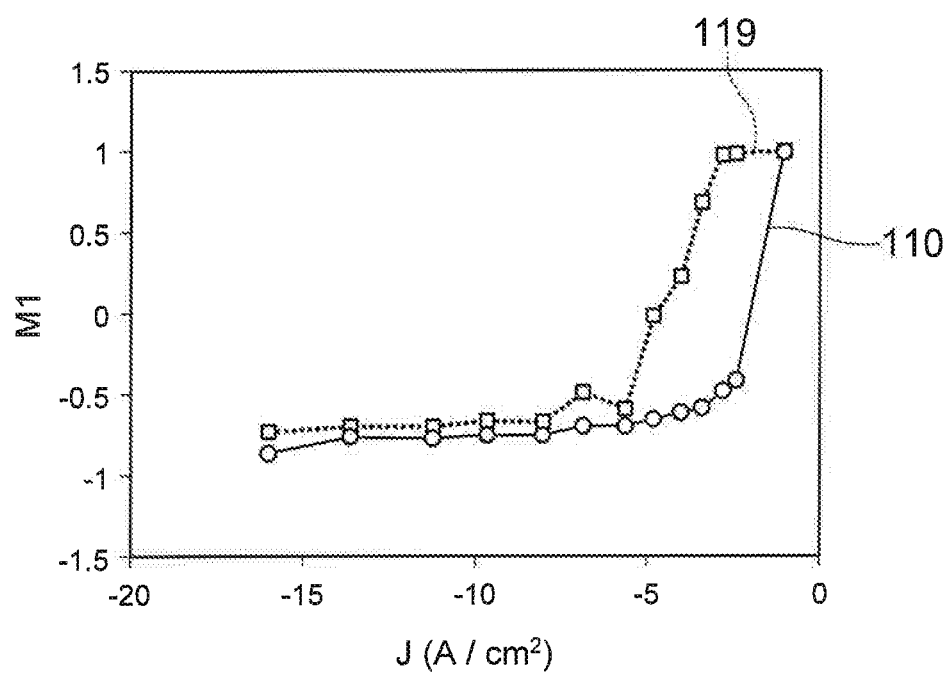
FIG. 3 is a graph illustrating characteristics of the magnetic heads.

FIG. 3 is a graph illustrating characteristics of the magnetic heads.

The horizontal axis of FIG. 3 is a current density J (A/cm$^2$) flowing in the stacked body 20. The vertical axis is a magnetization M1 of the third layer 23. The magnetization M1 is normalized. When the magnetization M1 is negative, the magnetization M1 has a component that is antiparallel to the magnetic field originally generated inside the write gap. The characteristic of the magnetic head 110 and the characteristic of the magnetic head 119 are shown in FIG. 3.

It can be seen from FIG. 3 that compared to the magnetic head 119, the magnetization M1 reverses at a low current density J for the magnetic head 110.

For the configurations of the magnetic heads 110 and 119, the reversal current density is simulated by modifying the magnetic volume of the third layer 23. In the magnetic head 110 of the simulation, the thickness of the stacked body 20 is fixed to 10 nm; and ta:tb is changed in a range of 1:4 to 3:2. On the other hand, the saturation magnetization of the third layer 23 is uniform in the magnetic head 119.

Figure 4:
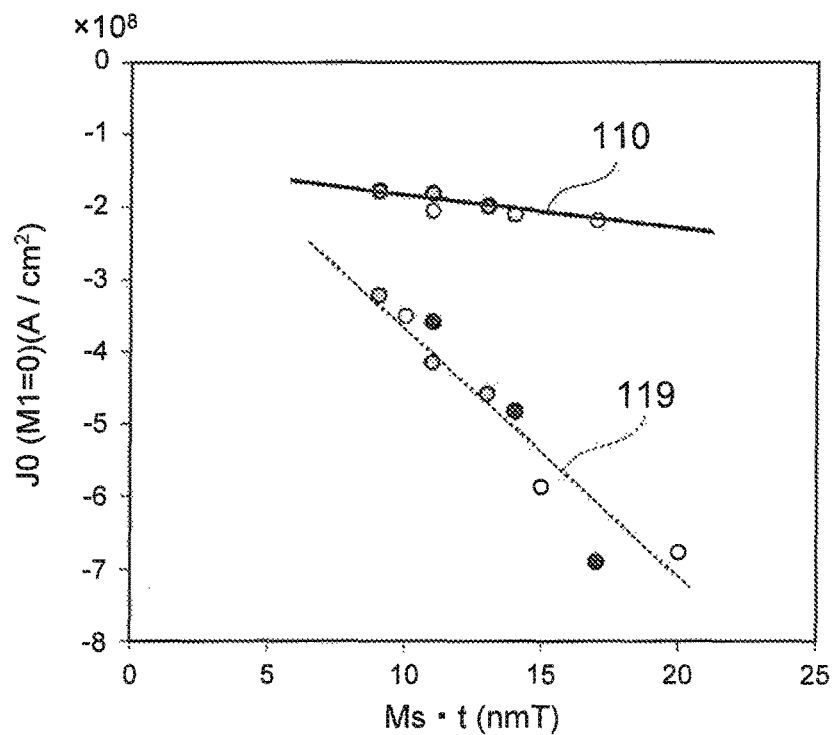
FIG. 4 is a graph illustrating characteristics of the magnetic heads.

FIG. 4 is a graph illustrating characteristics of the magnetic heads.

The horizontal axis of FIG. 4 is the magnetic volume Ms·t (nmT). The vertical axis is a reversal current density J0 (A/cm$^2$) at which the magnetization reverses. At the reversal current density J0, the magnetization M1 becomes 0; and the magnetization M1 is reversed by providing a current density higher than the reversal current density J0.

It can be seen from FIG. 4 that compared to the magnetic head 119, the absolute value of the reversal current density J0 is small for the magnetic head 110.

Thus, compared to the configuration of the magnetic head 119 (the saturation magnetization being the same inside the third layer 23), the reversal current density J0 can be small for the configuration of the magnetic head 110 (the saturation magnetizations being different inside the third layer 23.

Thus, the reversal current density J0 can be small for the configuration of the magnetic head 110 because the first magnetic region 23a having the small saturation magnetization is provided in the third layer 23.

An example of an operation of the magnetic head 110 according to the embodiment will now be described.

Figure 5:
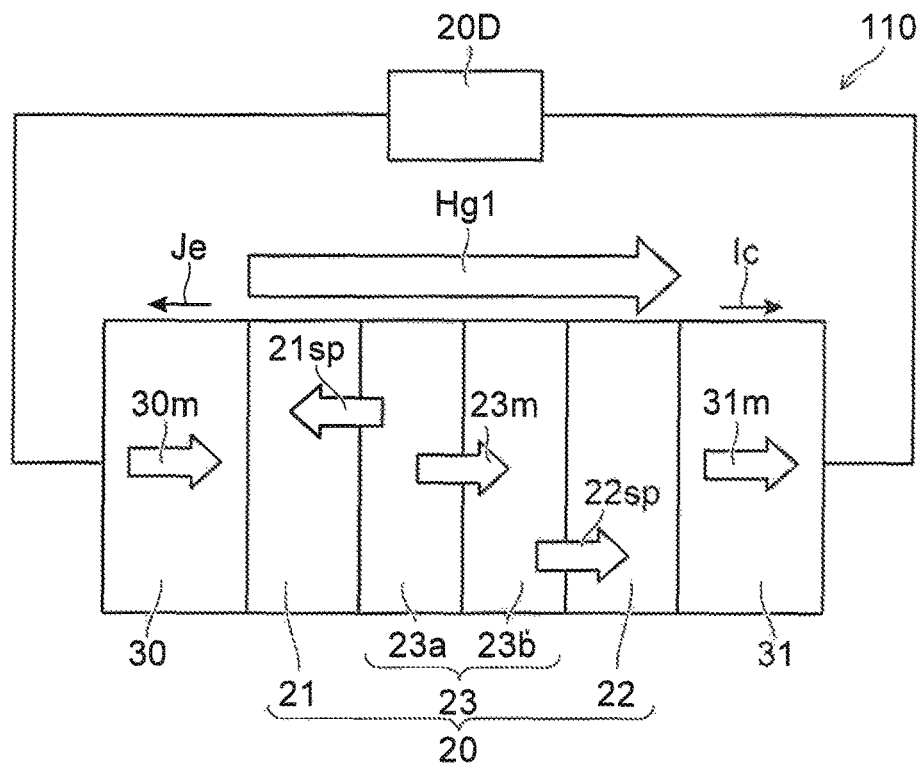
FIG. 5 is a schematic view illustrating the operation of the magnetic head.

FIG. 5 is a schematic view illustrating the operation of the magnetic head.

As shown in FIG. 5, the stacked body 20 is provided between the magnetic pole 30 and the first shield 31. The first layer 21, the second layer 22, and the third layer 23 are provided in the stacked body 20.

A recording current is supplied from the second electrical circuit 30D (referring to FIG. 1A) to the coil 30c of the magnetic pole 30. Thereby, a magnetic field is generated from the magnetic pole 30. The magnetic field is oriented toward the magnetic recording medium 80. Also, a gap magnetic field Hg1 is applied to the stacked body 20. The direction of the gap magnetic field Hg1 changes and is dependent on the polarity of the recording current. For example, in FIG. 5, the gap magnetic field Hg1 has a component from the magnetic pole 30 toward the first shield 31.

For example, a magnetization 30m of the magnetic pole 30 is from the magnetic pole 30 toward the first shield 31. A magnetization 31m of the first shield 31 also is from the magnetic pole 30 toward the first shield 31. When the current Ic is not flowing in the stacked body 20, the magnetization 23m of the third layer 23 of the stacked body 20 is from the magnetic pole 30 toward the first shield 31.

At this time, the current Ic is supplied from the first electrical circuit 20D to the stacked body 20. In the example, the current Ic is supplied to the stacked body 20 via the first shield 31 and the magnetic pole 30. The current Ic flows from the first layer 21 toward the second layer 22. An electron current Je flows at this time. The electron current Je flows from the second layer 22 toward the first layer 21.

Spin torque 21sp is generated by the electron current Je at the interface between the first layer 21 and the third layer 23. The spin torque 21sp is reflective. On the other hand, spin torque 22sp is generated by the electron current Je at the interface between the third layer 23 and the second layer 22. The spin torque 22sp is transmissive. The magnetization 23m of the third layer 23 is reversed by such spin torque. In other words, the magnetization 23m is from the first shield 31 toward the magnetic pole 30.

Thus, in the embodiment, the magnetization 23m of the third layer 23 has the reverse orientation of the magnetic field (the gap magnetic field Hg1) generated from the magnetic pole 30. By such magnetization orientations, the magnetic field that is generated from the magnetic pole 30 can be applied effectively to the magnetic recording medium 80.

The first magnetic region 23a and the second magnetic region 23b are provided in the embodiment. A spin torque that acts in the direction causing the magnetization 23m of the third layer 23 to reverse is supplied at the interface between the first magnetic region 23a and the first layer 21. At the interface between the second magnetic region 23b and the second layer 22, a spin torque that acts in the direction that suppresses the magnetization reversal of the third layer 23 is suppressed because the second layer 22 includes a material having a short spin relaxation length. By providing the second magnetic region 23b and the first magnetic region 23a having different saturation magnetizations in the third layer 23, the effect of the spin torque acting at the interface between the first magnetic region 23a and the first layer 21 is pronounced. Therefore, the magnetization 23m of the third layer 23 reverses easily.

In the embodiment, the reversal current density J0 can be reduced by providing the first magnetic region 23a and the second magnetic region 23b. For example, the magnetization 23m of the third layer 23 can be controlled by a small current Ic. The recording magnetic field can be applied effectively to the magnetic recording medium 80 by a small current Ic.

In FIG. 5, the magnetic field (the gap magnetic field Hg1) that has a component in the direction from the magnetic pole 30 toward the first shield 31 is emitted from the magnetic pole 30. As described above, the first electrical circuit 20D supplies, to the stacked body 20, the current Ic having the orientation from the first layer 21 toward the second layer 22. At this time, the magnetization 23m has a component in the reverse orientation of the gap magnetic field Hg1. On the other hand, even when the magnetic field (the gap magnetic field Hg1) that has the component in the direction from the first shield 31 toward the magnetic pole 30 is emitted from the magnetic pole 30, for example, the current direction can be the same as the state illustrated in FIG. 5. The orientation of the magnetization 30m of the magnetic pole 30, the orientation of the magnetization 31m of the first shield 31, and the orientation of the magnetization 23m of the third layer 23 when the current Ic is not caused to flow are aligned with the orientation of the gap magnetic field Hg1. The relationships between the magnetizations and the spin torques acting at each interface do not change.

In the embodiment, for example, when the current Ic is caused to flow between the first layer 21 and the second layer 22 (e.g., between the magnetic pole 30 and the first shield 31), the magnetization 23m of the third layer 23 includes a component in the reverse direction of the magnetic field (the gap magnetic field Hg1) generated from the magnetic pole 30.

For example, in the embodiment, the electrical resistance between the magnetic pole 30 and the second layer 22 when a first current (which may be the current Ic) is caused to flow between the first layer 21 and the second layer 22 is different from the electrical resistance between the magnetic pole 30 and the second layer 22 when the first current is not caused to flow between the first layer 21 and the second layer 22.

For example, in the embodiment, the electrical resistance between the first shield 31 and the first layer 21 when the first current is caused to flow between the first layer 21 and the second layer 22 is different from the electrical resistance between the first shield 31 and the first layer 21 when the first current is not caused to flow between the first layer 21 and the second layer 22.

For example, the electrical resistance difference recited above is based on the magnetoresistance effect. For example, the change of the magnetization 23m of the third layer 23 can be measured electrically by using such an effect.

Figure 6:
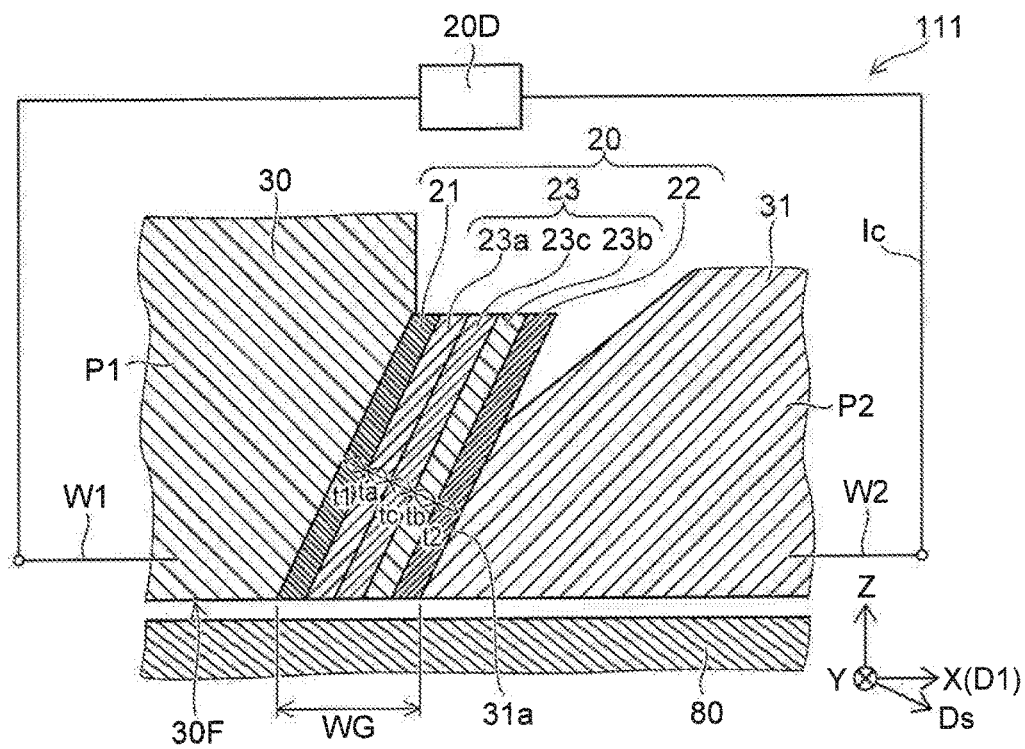
FIG. 6 is a schematic cross-sectional view illustrating another magnetic head according to the first embodiment.

FIG. 6 is a schematic cross-sectional view illustrating another magnetic head according to the first embodiment.

As shown in FIG. 6, the magnetic head 111 according to the embodiment also includes the magnetic pole 30, the first shield 31, and the stacked body 20 recited above. In the magnetic head 111 as well, the stacked body 20 includes the first layer 21, the second layer 22, and the third layer 23 recited above. In the magnetic head 111, the third layer 23 includes an intermediate region 23c in addition to the first magnetic region 23a and the second magnetic region 23b recited above. Otherwise, for example, the configuration of the magnetic head 111 is similar to the configuration of the magnetic head 110.

In the third layer 23, the first magnetic region 23a is provided between the first layer 21 and the second layer 22. The second magnetic region 23b is provided between the first magnetic region 23a and the second layer 22. For example, the first magnetic region 23a contacts the first layer 21. The second magnetic region 23b contacts the second layer 22.

The intermediate region 23c is provided between the first magnetic region 23a and the second magnetic region 23b. The intermediate region 23c contacts the first magnetic region 23a and the second magnetic region 23b. The intermediate region 23c includes at least one selected from the group consisting of Ru, Ir, and Rh.

In the magnetic head 111, the second saturation magnetization of the second magnetic region 23b is higher than the first saturation magnetization of the first magnetic region 23a.

Even in such a case, for example, the second magnetic region 23b includes at least one first element of Fe or Co at the first composition ratio. On the other hand, the first magnetic region 23a does not include the first element. Or, the first magnetic region 23a includes the first element at the second composition ratio that is lower than the first composition ratio. For example, in the case where FeCo is included in the first magnetic region 23a and the second magnetic region 23b, the second saturation magnetization can be set to be higher than the first saturation magnetization by changing the composition ratio.

For example, the second magnetic region 23b includes FeCo, Fe, Co, etc. On the other hand, the first magnetic region 23a includes Ni, FeNi, etc. Thereby, the second saturation magnetization is higher than the first saturation magnetization. For example, the saturation magnetizations of the first magnetic region 23a and the second magnetic region 23b can be adjusted by at least one of the various materials, the composition ratios of the various alloys, the materials of the superlattice films, or the film thickness ratio.

In the magnetic head 111, the intermediate region 23c is provided between the first magnetic region 23a and the second magnetic region 23b. The intermediate region 23c moderately causes magnetic coupling of the first magnetic region 23a and the second magnetic region 23b. In the magnetic head 111 as well, the magnetic field H2 that is emitted from the magnetic pole 30 is effectively oriented toward the magnetic recording medium 80 by utilizing the magnetization 23m of the third layer 23 of the stacked body 20. A magnetic head can be provided in which it is possible to increase the recording density.

In the magnetic head 111, it is favorable for a thickness tc of the intermediate region 23c (referring to FIG. 6) to be not less than 0.1 nm and not more than 5.0 nm. For example, in the case where the intermediate region 23c includes Ru, it is favorable for the thickness tc of the intermediate region 23c to be not less than 0.1 nm and not more than 5.0 nm. For example, in the case where the intermediate region 23c includes Ir, it is favorable for the thickness tc of the intermediate region 23c to be not less than 0.1 nm and not more than 5.0 nm. By using the intermediate region 23c having such a thickness, the magnetic coupling can be adjusted appropriately.

In the magnetic head 111 as well, the first electrical circuit 20D (referring to FIG. 6) may be provided. The first electrical circuit 20D is electrically connected to the first layer 21 and the second layer 22. For example, the first electrical circuit 20D is configured to supply, to the stacked body 20, the current Ic having the orientation from the first layer 21 toward the second layer 22.

In the magnetic head 111 as well, the magnetic field generated from the magnetic pole 30 can be applied effectively to the magnetic recording medium 80. In the magnetic head 111 as well, the reversal current density J0 can be reduced by providing the first magnetic region 23a and the second magnetic region 23b. For example, the magnetization 23m of the third layer 23 can be controlled by a small current Ic. The recording magnetic field can be applied effectively to the magnetic recording medium 80 by a small current Ic.

Second Embodiment

Figure 7:
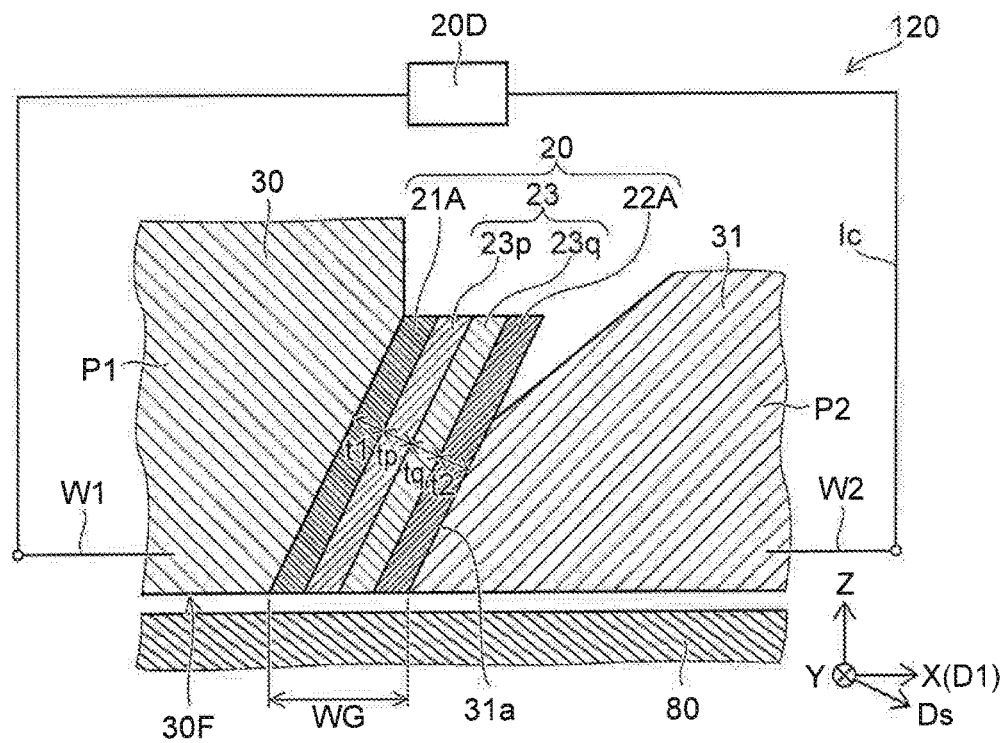
FIG. 7 is a schematic cross-sectional view illustrating a magnetic head according to a second embodiment.

FIG. 7 is a schematic cross-sectional view illustrating a magnetic head according to a second embodiment.

As shown in FIG. 7, the magnetic head 120 according to the second embodiment also includes the magnetic pole 30, the first shield 31, and the stacked body 20. In the magnetic head 120 as well, the stacked body 20 includes a first layer 21A, a second layer 22A, and the third layer 23 recited above. In the magnetic head 120, the third layer 23 includes a first magnetic region 23p and a second magnetic region 23q. Otherwise, for example, the configuration of the magnetic head 120 is similar to the configuration of the magnetic head 110.

In the magnetic head 120, the stacked body 20 includes the nonmagnetic first layer 21A, the nonmagnetic second layer 22A provided between the first layer 21A and the first shield 31, and the third layer 23. The third layer 23 is provided between the first layer 21A and the second layer 22A. The third layer 23 contacts the first layer 21A and the second layer 22A. The third layer 23 is electrically connected to the first layer 21A and the second layer 22A.

The first layer 21A includes at least one selected from the group consisting of Ta, Pt, W, Ru, Mo, and Pd.

The second layer 22A includes at least one selected from the group consisting of Cu, Ag, Au, and Al.

The thickness t1 of the first layer 21A is not less than 0.5 nm and not more than 5.0 nm. The thickness t2 of the second layer 22A is, for example, not less than 0.5 nm and not more than 5.0 nm.

The third layer 23 includes the first magnetic region 23p and the second magnetic region 23q. The second magnetic region 23q is provided between the first magnetic region 23p and the second layer 22A. The second magnetic region 23q contacts the first magnetic region 23a.

In the magnetic head 120, for example, a thickness tp of the first magnetic region 23p is not less than 0.5 times and not more than 5 times the thickness of the second magnetic region 23q. For example, the thickness tp of the first magnetic region 23p is, for example, not less than 4 nm and not more than 15 nm. A thickness tq of the second magnetic region 23q is, for example, not less than 1 nm and not more than 10 nm.

In the magnetic head 120, the second saturation magnetization of the second magnetic region 23q is smaller than the first saturation magnetization of the first magnetic region 23p.

The first magnetic region 23p includes at least one first element of Fe or Co at the first composition ratio. On the other hand, the second magnetic region 23q does not include the first element recited above. Or, the second magnetic region 23q includes the first element recited above at the second composition ratio that is lower than the first composition ratio. For example, in the case where FeCo is included in the first magnetic region 23p and the second magnetic region 23q, the second saturation magnetization can be set to be smaller than the first saturation magnetization by changing the composition ratio.

For example, the first magnetic region 23p includes FeCo, Fe, Co, etc. On the other hand, the second magnetic region 23q includes Ni, FeNi, etc. Thereby, the second saturation magnetization is smaller than the first saturation magnetization. For example, the saturation magnetizations of the first magnetic region 23p and the second magnetic region 23q can be adjusted by at least one of the various materials, the composition ratios of the various alloys, the materials of the superlattice films, or the film thickness ratio.

For example, the first electrical circuit 20D is provided. The first electrical circuit 20D is electrically connected to the first layer 21A and the second layer 22A. The current Ic that has the orientation from the second layer 22A toward the first layer 21A is suppliable to the stacked body 20.

In the magnetic head 120 as well, it is easy to effectively apply the magnetic field (the recording magnetic field) generated from the magnetic pole 30 to the magnetic recording medium 80 by causing the current Ic to flow in the stacked body 20.

In the magnetic head 120 as well, the reversal current density J0 can be reduced by providing the first magnetic region 23p and the second magnetic region 23q.

An example of an operation of the magnetic head 120 will now be described.

Figure 8:
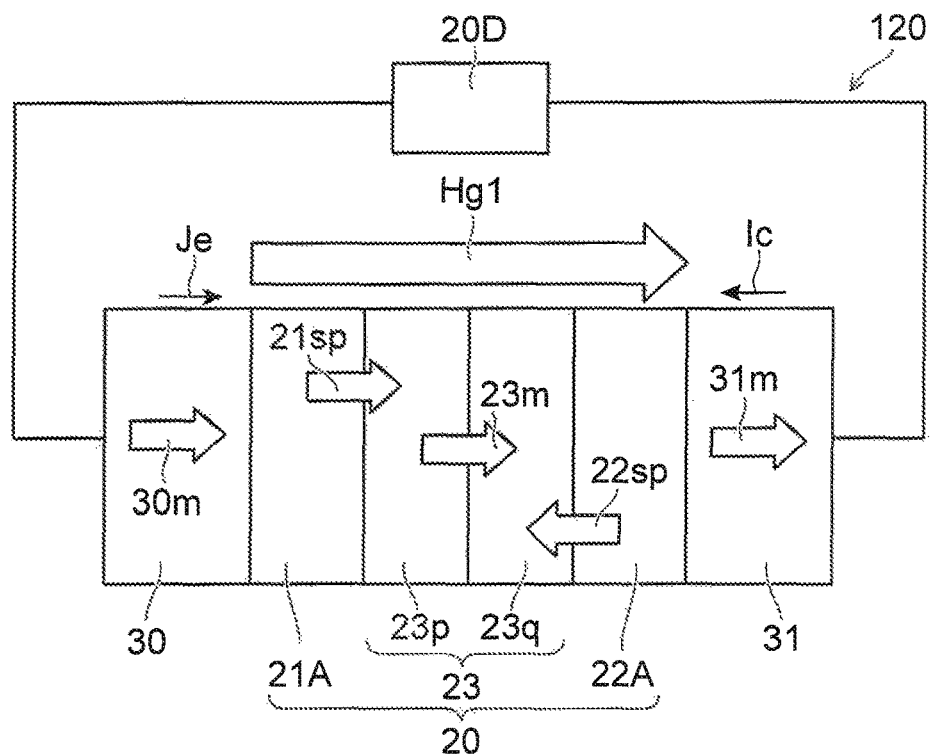
FIG. 8 is a schematic view illustrating the operation of the magnetic head.

FIG. 8 is a schematic view illustrating the operation of the magnetic head.

As shown in FIG. 8, the stacked body 20 is provided between the magnetic pole 30 and the first shield 31. The first layer 21A, the second layer 22A, and the third layer 23 are provided in the stacked body 20.

The recording current is supplied from the second electrical circuit 30D to the coil 30c of the magnetic pole 30. The gap magnetic field Hg1 (the recording magnetic field) is generated from the magnetic pole 30. The gap magnetic field Hg1 is applied to the stacked body 20. The gap magnetic field Hg1 has a component from the magnetic pole 30 toward the first shield 31.

For example, the magnetization 30m of the magnetic pole 30 is from the magnetic pole 30 toward the first shield 31. The magnetization 31m of the first shield 31 also is from the magnetic pole 30 toward the first shield 31. When the current Ic is not flowing in the stacked body 20, the magnetization 23m of the third layer 23 of the stacked body 20 is from the magnetic pole 30 toward the first shield 31.

At this time, the current Ic is supplied from the first electrical circuit 20D to the stacked body 20. In the example, the current Ic is supplied to the stacked body 20 via the first shield 31 and the magnetic pole 30. The current Ic flows from the second layer 22A toward the first layer 21A. The electron current Je flows at this time. The electron current Je flows from the first layer 21A toward the second layer 22A.

The spin torques 21sp (the transmissive spin torque) and 22sp (the reflective spin torque) act on the third layer 23 due to the electron current Je. Due to the action of these spin torques, the magnetization 23m of the third layer 23 has the reverse orientation of the magnetic field (the gap magnetic field Hg1) generated from the magnetic pole 30. By such a magnetization 23m, the magnetic field generated from the magnetic pole 30 can be applied effectively to the magnetic recording medium 80. The first magnetic region 23p and the second magnetic region 23q are provided in the magnetic head 120. A spin torque that suppresses the reversal of the magnetization 23m acts on the third layer 23 at the interface between the first magnetic region 23p and the first layer 21A. The action of the spin torque is suppressed because the first layer 21A includes a material having a short spin relaxation length. A spin torque that urges the reversal of the magnetization 23m acts at the interface between the second magnetic region 23q and the second layer 22A. The effects of the spin torque acting at the interface between the second magnetic region 23q and the second layer 22A is pronounced because the first magnetic region 23p and the second magnetic region 23q having different saturation magnetizations are provided in the third layer 23. Therefore, the magnetization 23m of the third layer 23 reverses easily.

In the magnetic head 120 as well, the reversal current density J0 can be reduced by providing the first magnetic region 23p and the second magnetic region 23q. For example, the magnetization 23m of the third layer 23 can be controlled by a small current Ic. An effective application to the magnetic recording medium 80 can be performed by using the small current Ic.

In FIG. 8, the magnetic field (the gap magnetic field Hg1) that has the component in the direction from the magnetic pole 30 toward the first shield 31 is emitted from the magnetic pole 30. As described above, the first electrical circuit 20D supplies, to the stacked body 20, the current Ic having the orientation from the second layer 22A toward the first layer 21A. At this time, the magnetization 23m has a component in the reverse orientation of the gap magnetic field Hg1. On the other hand, the first electrical circuit 20D supplies, to the stacked body 20, the current Ic having the orientation from the second layer 22A toward the first layer 21A even when the magnetic field (the gap magnetic field Hg1) having the component in the direction from the first shield 31 toward the magnetic pole 30 is emitted from the magnetic pole 30. In such a case as well, the magnetization 23m has a component in the reverse orientation of the gap magnetic field Hg1.

For example, in the magnetic head 120, the electrical resistance between the magnetic pole 30 and the second layer 22A when the first current (which may be the current Ic) is caused to flow between the first layer 21A and the second layer 22A is different from the electrical resistance between the magnetic pole 30 and the second layer 22A when the first current is not caused to flow between the first layer 21A and the second layer 22A.

For example, in the magnetic head 120, the electrical resistance between the first shield 31 and the first layer 21A when the first current is caused to flow between the first layer 21A and the second layer 22A is different from the electrical resistance between the first shield 31 and the first layer 21A when the first current is not caused to flow between the first layer 21A and the second layer 22A.

For example, the electrical resistance difference recited above is based on the magnetoresistance effect. For example, the change of the magnetization 23m of the third layer 23 can be measured electrically by using such an effect.

Figure 9:
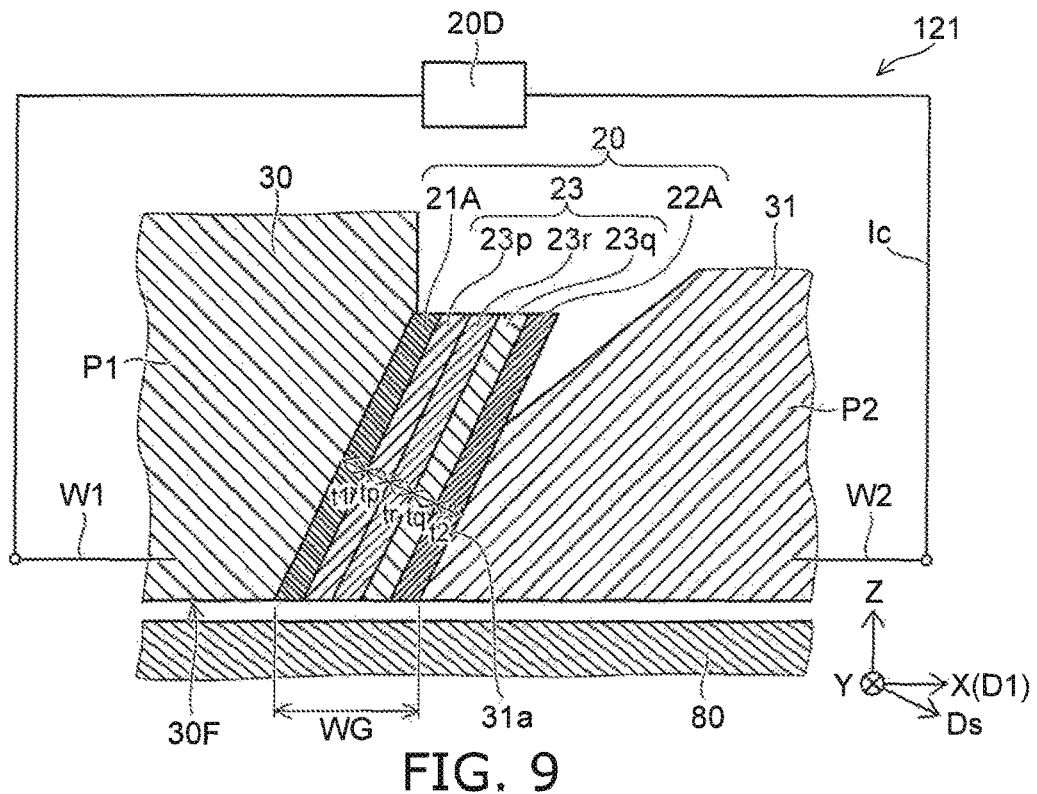
FIG. 9 is a schematic cross-sectional view illustrating another magnetic head according to the second embodiment.

FIG. 9 is a schematic cross-sectional view illustrating another magnetic head according to the second embodiment.

As shown in FIG. 9, the magnetic head 121 according to the embodiment also includes the magnetic pole 30, the first shield 31, and the stacked body 20 recited above. In the magnetic head 121 as well, the stacked body 20 includes the third layer 23, the second layer 22A, and the first layer 21A recited above. In the magnetic head 121, the third layer 23 includes an intermediate region 23r in addition to the first magnetic region 23p and the second magnetic region 23q recited above. Otherwise, for example, the configuration of the magnetic head 121 is similar to the configuration of the magnetic head 120.

In the third layer 23, the first magnetic region 23p is provided between the first layer 21A and the second layer 22A. The second magnetic region 23q is provided between the first magnetic region 23p and the second layer 22A. For example, the first magnetic region 23p contacts the first layer 21A. The second magnetic region 23q contacts the second layer 22A.

The intermediate region 23r is provided between the first magnetic region 23p and the second magnetic region 23q. The intermediate region 23r contacts the first magnetic region 23p and the second magnetic region 23q. The intermediate region 23r includes at least one selected from the group consisting of Ru, Ir, and Rh.

In the magnetic head 121, the second saturation magnetization of the second magnetic region 23q is smaller than the first saturation magnetization of the first magnetic region 23p.

Even in such a case, for example, the first magnetic region 23p includes at least one first element of Fe or Co at the first composition ratio. On the other hand, the second magnetic region 23q does not include the first element. Or, the second magnetic region 23q includes the first element at the second composition ratio that is lower than the first composition ratio. For example, even in the case where FeCo is included in the first magnetic region 23p and the second magnetic region 23q, the second saturation magnetization can be set to be smaller than the first saturation magnetization by changing the composition ratio.

For example, the first magnetic region 23p includes FeCo, Fe, Co, etc. On the other hand, the second magnetic region 23q includes Ni, FeNi, etc. Thereby, the second saturation magnetization is smaller than the first saturation magnetization. For example, the saturation magnetizations of the first magnetic region 23p and the second magnetic region 23q can be adjusted by at least one of the various materials, the composition ratios of the various alloys, the materials of the superlattice films, or the film thickness ratio.

In the magnetic head 121, the intermediate region 23r is provided between the first magnetic region 23p and the second magnetic region 23q. The intermediate region 23r causes moderate magnetic coupling of the first magnetic region 23p and the second magnetic region 23q. In the magnetic head 121 as well, the magnetic field H2 that is emitted from the magnetic pole 30 is effectively oriented toward the magnetic recording medium 80 by utilizing the magnetization 23m of the third layer 23 of the stacked body 20. A magnetic head can be provided in which it is possible to increase the recording density.

In the magnetic head 121, it is favorable for a thickness tr of the intermediate region 23r to be not less than 0.1 nm and not more than 5.0 nm. For example, in the case where the intermediate region 23r includes Ru, it is favorable for the thickness tr of the intermediate region 23r to be not less than 0.1 nm and not more than 5.0 nm. For example, in the case where the intermediate region 23r includes Ir, it is favorable for the thickness tc of the intermediate region 23r to be not less than 0.1 nm and not more than 5.0 nm.

In the magnetic head 121 as well, the first electrical circuit 20D may be provided. The first electrical circuit 20D is electrically connected to the first layer 21A and the second layer 22A. The first electrical circuit 20D is configured to supply, to the stacked body 20, the current Ic having the orientation from the second layer 22A toward the first layer 21A.

In the magnetic head 121 as well, the magnetic field generated from the magnetic pole 30 can be applied effectively to the magnetic recording medium 80. In the magnetic head 121 as well, the reversal current density J0 can be reduced by providing the first magnetic region 23p and the second magnetic region 23q. For example, the magnetization 23m of the third layer 23 can be controlled by a small current Ic. The recording magnetic field can be applied effectively to the magnetic recording medium 80 by a small current Ic.

An example of a magnetic recording and reproducing device according to the embodiment will now be described.

Figure 10:
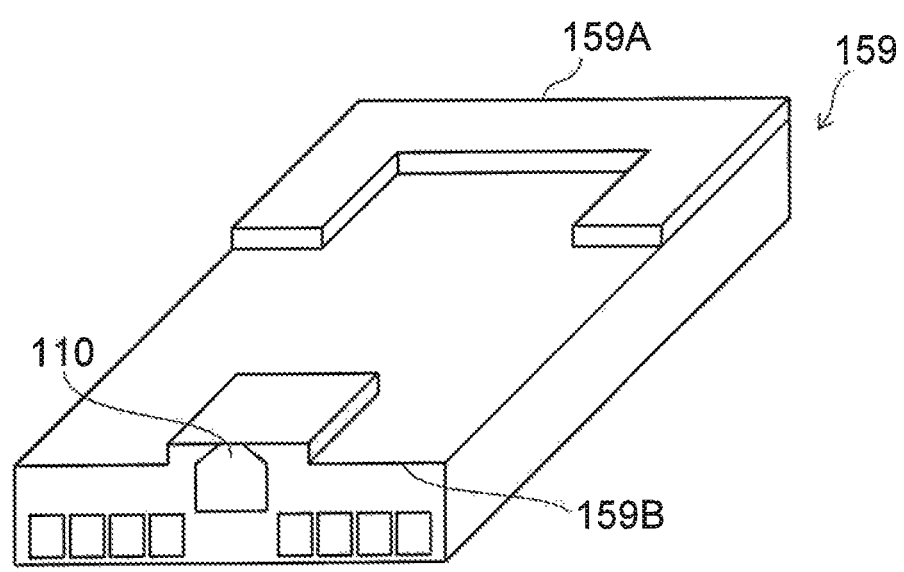
FIG. 10 is a schematic perspective view illustrating a portion of the magnetic recording and reproducing device according to the embodiment.

FIG. 10 is a schematic perspective view illustrating a portion of the magnetic recording and reproducing device according to the embodiment.

FIG. 10 illustrates a head slider.

The magnetic head 110 is provided in the head slider 159. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 11:
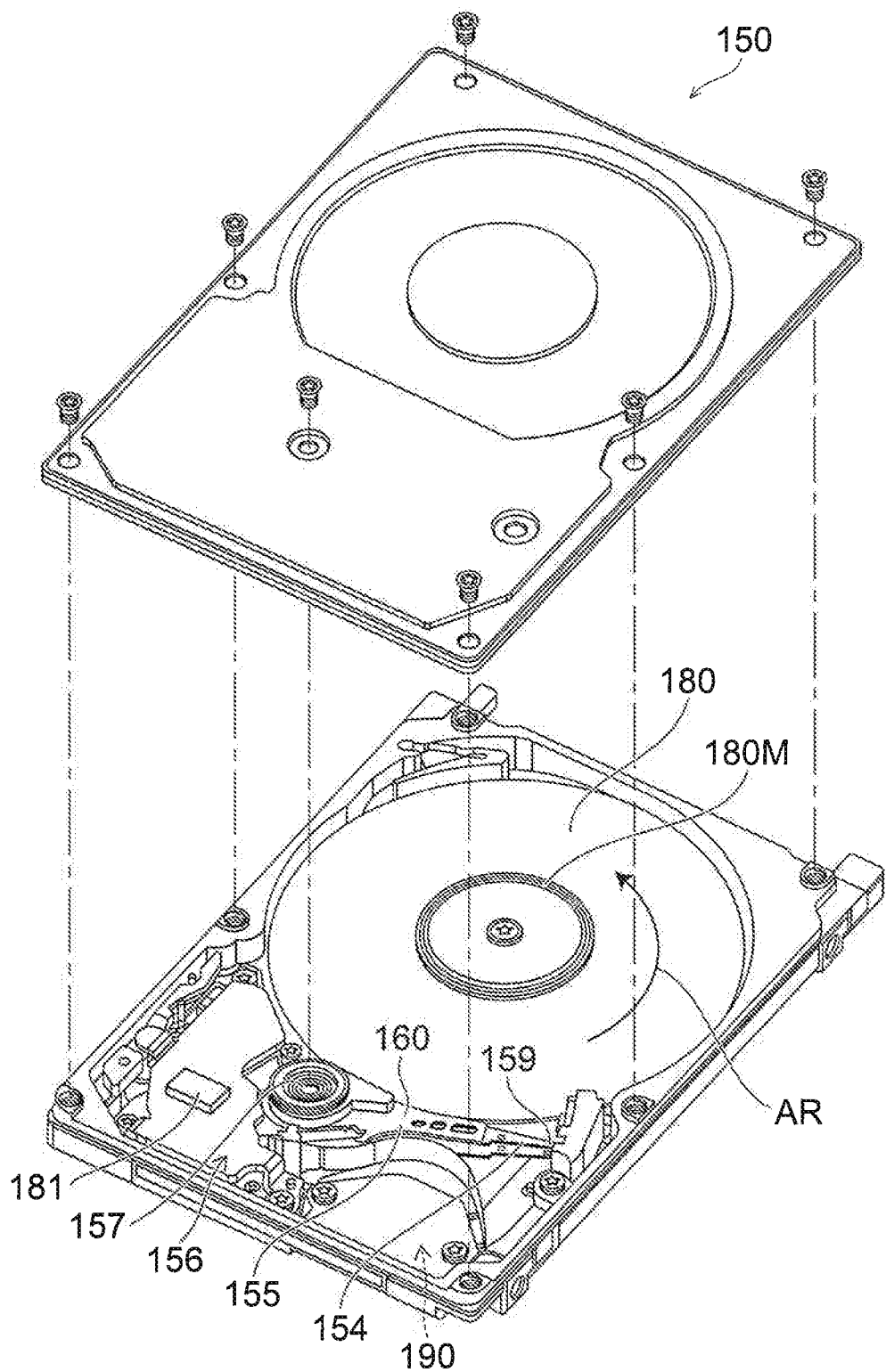
FIG. 11 is a schematic perspective view illustrating the magnetic recording and reproducing device according to the embodiment.

FIG. 11 is a schematic perspective view illustrating the magnetic recording and reproducing device according to the embodiment.

Figure 12A:
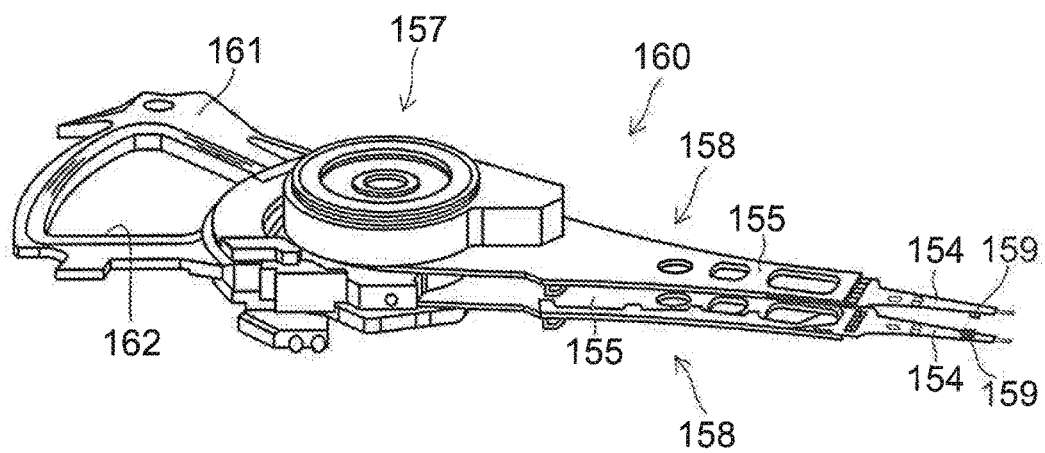
FIG. 12A and FIG. 12B are schematic perspective views illustrating a portion of the magnetic recording and reproducing device according to the embodiment.
Figure 12B:
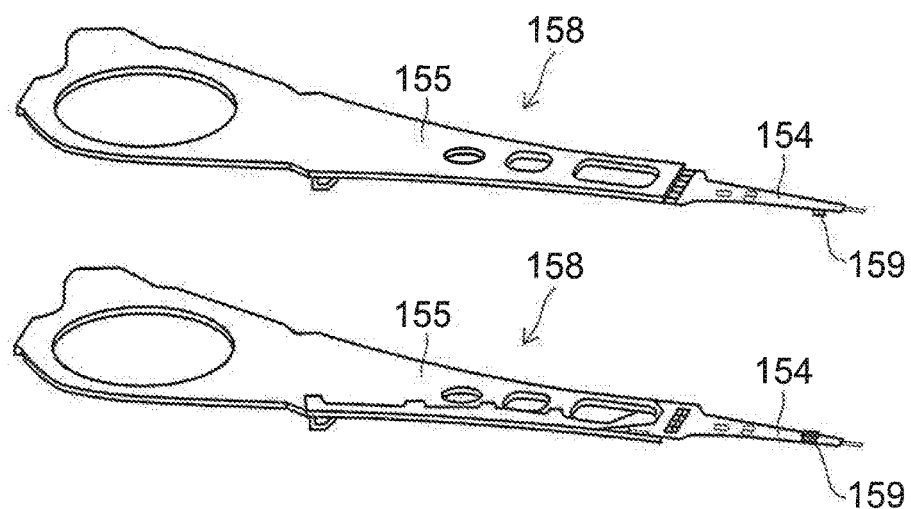

FIG. 12A and FIG. 12B are schematic perspective views illustrating a portion of the magnetic recording and reproducing device according to the embodiment.

As shown in FIG. 11, a rotary actuator is used in the magnetic recording and reproducing device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording and reproducing device 150 according to the embodiment may include multiple recording medium disks 180. The magnetic recording and reproducing device 150 may include a recording medium 181. The recording medium 181 is, for example, a SSD (Solid State Drive). The recording medium 181 includes, for example, nonvolatile memory such as flash memory, etc. For example, the magnetic recording and reproducing device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-opposing surface (the ABS) of the head slider 159 are balanced. The distance between the medium-opposing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, the drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 12A illustrates the configuration of a portion of the magnetic recording and reproducing device and is an enlarged perspective view of a head stack assembly 160.

FIG. 12B is a perspective view illustrating a magnetic head assembly (a head gimbal assembly (HGA)) 158 that is a portion of the head stack assembly 160.

As shown in FIG. 12A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 12B, the head gimbal assembly 158 includes the arm 155 extending from the bearing part 157, and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) that are for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording and reproducing device 150. The signal processor 190 records and reproduces the signals to and from the magnetic recording medium by using the magnetic head. In the signal processor 190, for example, the input/output lines of the signal processor 190 are electrically connected to the magnetic head by being connected to electrode pads of the head gimbal assembly 158.

The magnetic recording and reproducing device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The magnetic recording and reproducing device 150 according to the embodiment includes a magnetic recording medium, the magnetic head assembly according to the embodiment, and a signal processor that records and reproduces the signals to and from the magnetic recording medium by using a magnetic head provided in the magnetic head assembly.

The embodiments may include the following configurations (technological proposals).

Configuration 1

A magnetic head, comprising:
a magnetic pole;
a first shield; and
a stacked body provided between the magnetic pole and the first shield,
the stacked body including
a first layer, the first layer being nonmagnetic,
a second layer provided between the first layer and the first shield, the second layer being nonmagnetic, and
a third layer contacting the first layer and the second layer, being provided between the first layer and the second layer, and being electrically connected to the first layer and the second layer,
the third layer including
a first magnetic region, and
a second magnetic region contacting the first magnetic region and being provided between the first magnetic region and the second layer,
a second saturation magnetization of the second magnetic region being higher than a first saturation magnetization of the first magnetic region.

Configuration 2

A magnetic head, comprising:
a magnetic pole;
a first shield; and
a stacked body provided between the magnetic pole and the first shield,
the stacked body including
a first layer, the first layer being nonmagnetic,
a second layer provided between the first layer and the first shield, the second layer being nonmagnetic, and
a third layer contacting the first layer and the second layer, being provided between the first layer and the second layer, and being electrically connected to the first layer and the second layer,
the third layer including
a first magnetic region, and
a second magnetic region contacting the first magnetic region and being provided between the first magnetic region and the second layer,
the second magnetic region including at least one first element of Fe or Co at a first composition ratio,
the first magnetic region not including the first element, or including the first element at a second composition ratio lower than the first composition ratio.

Configuration 3

A magnetic head, comprising:
a magnetic pole;
a first shield; and
a stacked body provided between the magnetic pole and the first shield,
the stacked body including
a first layer, the first layer being nonmagnetic,
a second layer provided between the first layer and the first shield, the second layer being nonmagnetic, and
a third layer contacting the first layer and the second layer, being provided between the first layer and the second layer, and being electrically connected to the first layer and the second layer,
the third layer including
a first magnetic region, a second magnetic region provided between the first magnetic region and the first shield, and an intermediate region including at least one selected from the group consisting of Ru, Ir, and Rh, being provided between the first magnetic region and the second magnetic region, and contacting the first magnetic region and the second magnetic region, a second saturation magnetization of the second magnetic region being higher than a first saturation magnetization of the first magnetic region.

Configuration 4

A magnetic head, comprising:

a magnetic pole;

a first shield; and a stacked body provided between the magnetic pole and the first shield, the stacked body including a first layer, the first layer being nonmagnetic, a second layer provided between the first layer and the first shield, the second layer being nonmagnetic, and a third layer contacting the first layer and the second layer, being provided between the first layer and the second layer, and being electrically connected to the first layer and the second layer, the third layer including a first magnetic region, a second magnetic region provided between the first magnetic region and the first shield, and an intermediate region including at least one selected from the group consisting of Ru, Ir, and Rh, being provided between the first magnetic region and the second magnetic region, and contacting the first magnetic region and the second magnetic region, the second magnetic region including at least one first element of Fe or Co at a first composition ratio, the first magnetic region not including the first element, or including the first element at a second composition ratio lower than the first composition ratio.

Configuration 5

The magnetic head according to Configuration 3 or 4, wherein a thickness of the intermediate region is not less than 0.1 nm and not more than 5.0 nm.

Configuration 6

The magnetic head according to any one of Configurations 1 to 5, wherein the second layer includes at least one selected from the group consisting of Ta, Pt, W, Ru, Mo, and Pd.

Configuration 7

The magnetic head according to any one of Configurations 1 to 6, wherein the first layer includes at least one selected from the group consisting of Cu, Ag, Au, and Al.

Configuration 8

The magnetic head according to any one of Configurations 1 to 7, wherein a thickness of the first magnetic region is not less than 0.2 times and not more than 2.0 times a thickness of the second magnetic region.

Configuration 9

The magnetic head according to any one of Configurations 1 to 7, wherein a thickness of the first magnetic region is not less than 1 nm and not more than 10 nm, and a thickness of the second magnetic region is not less than 4 nm and not more than 15 nm.

Configuration 10

A magnetic recording and reproducing device, comprising:

the magnetic head according to any one of Configurations 1 to 9; and a first electrical circuit electrically connected to the first layer and the second layer and configured to supply, to the stacked body, a current having an orientation from the first layer toward the second layer.

Configuration 11

A magnetic head, comprising:

a magnetic pole;

a first shield; and a stacked body provided between the magnetic pole and the first shield, the stacked body including a first layer, the first layer being nonmagnetic, a second layer provided between the first layer and the first shield, the second layer being nonmagnetic, and a third layer contacting the first layer and the second layer, being provided between the first layer and the second layer, and being electrically connected to the first layer and the second layer, the third layer including a first magnetic region, and a second magnetic region contacting the first magnetic region and being provided between the first magnetic region and the second layer, a second saturation magnetization of the second magnetic region being smaller than a first saturation magnetization of the first magnetic region.

Configuration 12

A magnetic head, comprising:

a magnetic pole;

a first shield; and a stacked body provided between the magnetic pole and the first shield, the stacked body including a first layer, the first layer being nonmagnetic, a second layer provided between the first layer and the first shield, the second layer being nonmagnetic, and a third layer contacting the first layer and the second layer, being provided between the first layer and the second layer, and being electrically connected to the first layer and the second layer, the third layer including a first magnetic region, and a second magnetic region contacting the first magnetic region and being provided between the first magnetic region and the second layer, the first magnetic region including at least one first element of Fe or Co at a first composition ratio, the second magnetic region not including the first element, or including the first element at a second composition ratio lower than the first composition ratio.

Configuration 13

A magnetic head, comprising:

a magnetic pole;

a first shield; and a stacked body provided between the magnetic pole and the first shield, the stacked body including a first layer, the first layer being nonmagnetic, a second layer provided between the first layer and the first shield, the second layer being nonmagnetic, and a third layer contacting the first layer and the second layer, being provided between the first layer and the second layer, and being electrically connected to the first layer and the second layer, the third layer including a first magnetic region,
a second magnetic region provided between the first magnetic region and the first shield, and
an intermediate region including at least one selected from the group consisting of Ru, Ir, and Rh, being provided between the first magnetic region and the second magnetic region, and contacting the first magnetic region and the second magnetic region,
a second saturation magnetization of the second magnetic region being smaller than a first saturation magnetization of the first magnetic region.

Configuration 14

A magnetic head, comprising:
a magnetic pole;
a first shield; and
a stacked body provided between the magnetic pole and the first shield,
the stacked body including
a first layer, the first layer being nonmagnetic,
a second layer provided between the first layer and the first shield, the second layer being nonmagnetic, and
a third layer contacting the first layer and the second layer, being provided between the first layer and the second layer, and being electrically connected to the first layer and the second layer,
the third layer including
a first magnetic region,
a second magnetic region provided between the first magnetic region and the first shield, and
an intermediate region including at least one selected from the group consisting of Ru, Ir, and Rh, being provided between the first magnetic region and the second magnetic region, and contacting the first magnetic region and the second magnetic region,
the first magnetic region including at least one first element of Fe or Co at a first composition ratio,
the second magnetic region not including the first element, or including the first element at a second composition ratio lower than the first composition ratio.

Configuration 15

The magnetic head according to Configuration 13 or 14, wherein a thickness of the intermediate region is not less than 0.1 nm and not more than 5.0 nm.

Configuration 16

The magnetic head according to any one of Configurations 11 to 15, wherein the first layer includes at least one selected from the group consisting of Ta, Pt, W, Ru, Mo, and Pd.

Configuration 17

The magnetic head according to any one of Configurations 11 to 16, wherein the second layer includes at least one selected from the group consisting of Cu, Ag, Au, and Al.

Configuration 18

The magnetic head according to any one of Configurations 11 to 17, wherein a thickness of the second magnetic region is not less than 0.2 times and not more than 2.0 times a thickness of the first magnetic region.

Configuration 19

The magnetic head according to any one of Configurations 1 to 17, wherein
a thickness of the first magnetic region is not less than 4 nm and not more than 15 nm, and
a thickness of the second magnetic region is not less than 1 nm and not more than 10 nm.

Configuration 20

A magnetic recording and reproducing device, comprising:
the magnetic head according to any one of Configurations 11 to 19; and
a first electrical circuit electrically connected to the first layer and the second layer and configured to supply, to the stacked body, a current having an orientation from the second layer toward the first layer.

According to the embodiments, a magnetic head and a magnetic recording and reproducing device can be provided in which it is possible to increase the recording density.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, first shields, second shields, stacked bodies, magnetic layers, conductive layers, interconnects, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording and reproducing devices practicable by an appropriate design modification by one skilled in the art based on the magnetic heads, and the magnetic recording and reproducing meads described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
a magnetic pole;
a first shield; and
a stacked body provided between the magnetic pole and the first shield,
the stacked body including
a first layer directly contacting the magnetic pole, the first layer being nonmagnetic,
a second layer provided between the first layer and the first shield, the second layer directly contacting the first shield, the second layer being nonmagnetic, and
a third layer contacting the first layer and the second layer, being provided between the first layer and the second layer, and being electrically connected to the first layer and the second layer, the third layer including
  a first magnetic region, and
  a second magnetic region contacting the first magnetic region and being provided between the first magnetic region and the second layer,
a second saturation magnetization of the second magnetic region being higher than a first saturation magnetization of the first magnetic region.

2. The magnetic head according to claim 1, wherein the second layer includes at least one selected from the group consisting of Ta, Pt, W, Ru, Mo, and Pd.

3. The magnetic head according to claim 1, wherein the first layer includes at least one selected from the group consisting of Cu, Ag, Au, and Al.

4. The magnetic head according to claim 1, wherein a thickness of the first magnetic region is not less than 0.2 times and not more than 2.0 times a thickness of the second magnetic region.

5. The magnetic head according to claim 1, wherein
  a thickness of the first magnetic region is not less than 1 nm and not more than 10 nm, and
  a thickness of the second magnetic region is not less than 4 nm and not more than 15 nm.

6. A magnetic recording and reproducing device, comprising:
  the magnetic head according to claim 1; and
  a first electrical circuit electrically connected to the first layer and the second layer and configured to supply, to the stacked body, a current having an orientation from the first layer toward the second layer.

7. The magnetic head according to claim 1, wherein a magnetization of the third layer reverses when a current flows through the stacked body.

8. A magnetic head, comprising:
  a magnetic pole;
  a first shield; and
  a stacked body provided between the magnetic pole and the first shield,
  the stacked body including
    a first layer directly contacting the magnetic pole, the first layer being nonmagnetic,
    a second layer provided between the first layer and the first shield, the second layer directly contacting the first shield, the second layer being nonmagnetic, and
    a third layer contacting the first layer and the second layer, being provided between the first layer and the second layer, and being electrically connected to the first layer and the second layer,
  the third layer including
    a first magnetic region, and
    a second magnetic region contacting the first magnetic region and being provided between the first magnetic region and the second layer,
  the second magnetic region including at least one first element of Fe or Co at a first composition ratio,
  the first magnetic region not including the first element, or including the first element at a second composition ratio lower than the first composition ratio.

9. The magnetic head according to claim 8, wherein a magnetization of the third layer reverses when a current flows through the stacked body.

* * * * *